May 4, 1965  L. REYMOND  3,181,445
VIEW FINDER

Filed Oct. 31, 1961 3 Sheets-Sheet 2

INVENTOR
LUCIEN REYMOND

BY
Cameron, Kerkam & Sutton
ATTORNEYS

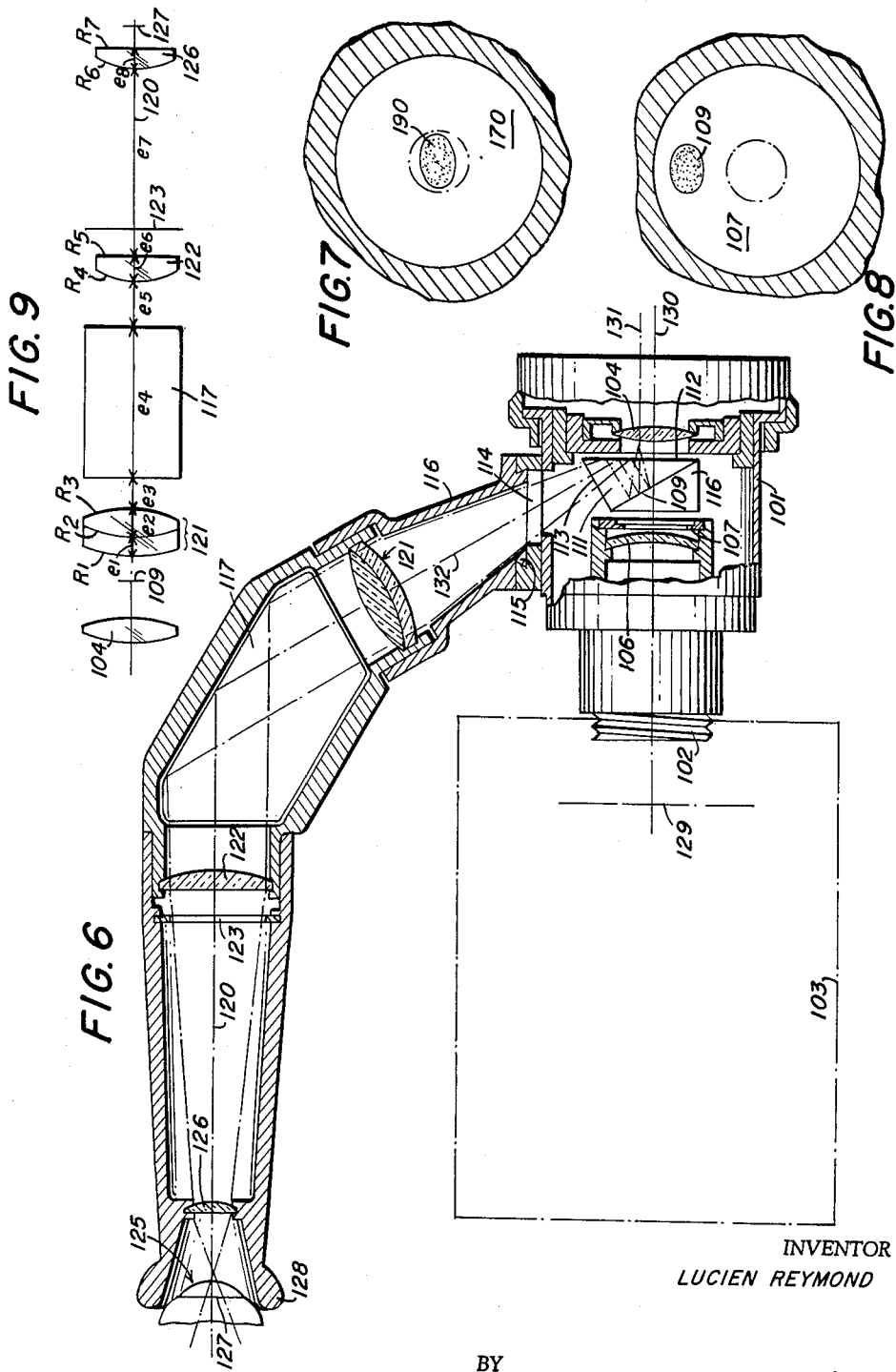

United States Patent Office

3,181,445
Patented May 4, 1965

3,181,445
VIEW FINDER
Lucien Reymond, Paris, France, assignor to Societe d'Optique et de Mecanique de Haute Precision, Paris, France, a company of France
Filed Oct. 31, 1961, Ser. No. 148,960
Claims priority, application France, Oct. 12, 1954, 677,678; Mar. 29, 1961, 857,154, Patent 1,293,087
5 Claims. (Cl. 95—42)

This application is a continuation-in-part of U.S. application Serial No. 535,333, filed September 20, 1955, by applicant, entitled "A View-Finder," and now abandoned.

The present invention relates to view finders, particularly for use with cameras, by means of which the camera operator is enabled to view continuously the scene, or subject, available to the photo-sensitive surface in the camera.

The invention is more particularly concerned with view finders of the type in which part of the light rays which penetrate the camera objective are reflected laterally to form a finder image which may be viewed by the operator, and which corresponds to the image formed by said camera objective on the photo-sensitive surface, e.g. on the film, provided in said camera, whereby the operator is enabled to view said finder image, even during the operation of the camera.

A known view finder of the type described hereinabove comprises, interposed in the path of the light rays which pass through the camera objective, a reflecting surface so arranged that it allows part of the light rays to be directed towards the photo-sensitive surface, or film, while reflecting laterally the remainder of the light rays so as to direct the same into an optical system in which said finder image is formed.

In one known kind of such view finders said finder image is formed on a diffusing surface, such as a screen of frosted glass. However, it has been found that the finder image obtained by this method has comparatively poor brightness.

Another kind of such view finders has therefore been suggested wherein the finder image is not formed on a screen, but in the air space behind a lens, or lens system, said image being viewed by the operator through a magnifying glass, or occular lens.

In either one of the above mentioned arrangements the reflecting surface is of the "semi-reflecting" type, i.e., of the type which, while reflecting part of the impingent light, allows the remainder of said light to pass through said surface towards the photo-sensitive surface. The semi-reflecting surface may be a simple glass surface inclined at an angle with respect to the direction of the impingent light rays, or by a semi-transparent layer of silver, aluminium or the like, deposited on the inclined glass surface. As this semi-reflecting surface is interposed in the path of the light directed by the camera objective towards the film (or similar photo-sensitive layer), it is necessary that only a comparatively small portion of the light be reflected, so that sufficient light may pass through said surface and be received by said film. On the other hand, it is necessary obviously that said reflected portion of the light be sufficiently large to achieve the desired brightness of the finder image. A compromise must therefore be found between the transparency (or the reflective power) and the size of said semi-reflecting surface, so as to achieve as high a brightness as possible of both the image on the film, and the finder image.

It is the principal object of the present invention to provide a view finder of the type described, wherein the reflecting surface has a size so small as to retain but a negligible portion of the light rays penetrating the camera objective, while allowing maximum brightness of the finder image to be obtained.

With this object in view, the invention provides a view finder for a camera, wherein the reflecting surface comprises a substantially opaque surface the size of which substantially coresponds to that of the pupil of an operator's eye. Thus reflecting surface is arranged in the path of the light rays which are emitted from the subject to be photographed and which penetrate the objective of the camera. This surface is positioned at an angle with respect to the optical axis of the camera objective so as to reflect part of said light rays into an optical system. This optical system comprises at least one finder objective lens for forming a real image of said reflecting surface and a real image of said subject; restoring means for restoring the attitude of said images; and an ocular lens for forming a final real image of the reflecting surface in the plane normally occupied by the pupil of the operator's eye and for viewing the restored real image of the subject. The magnification ratio of this optical system should have a value close to unity, whereby the final real image of the reflecting surface is located entirely within the periphery of the pupil of the operator's eye.

In this arrangement all the light rays received by the reflecting surface will be reflected into the optical view finder system, as said surface is opaque and does not allow any light rays to pass through it. Furthermore the magnification ratio of the view finder system having a value close to unity, and the reflecting surface being of the same size as that of the pupil of the operator's eye, none of the light reflected by said surface is lost for the operator's eye, due to the fact that the final image of the reflecting surface is formed in the plane occupied by the pupil of the eye, and consequently located within the periphery of the latter. Because of the small size of the reflecting surface, the portion of the light captured by the latter, as compared with the total light emitted from the subject and penetrating the camera objective, is substantially negligible. A view finder constructed according to the invention thus allows a bright finder image to be obtained without producing any notably undesirable effect upon the brightness and general quality of the image formed by the camera objective on the photographic film, or similar photo-sensitive material.

In one embodiment of the view-finder according to the invention, the reflecting surface, which preferably has a circular shape, is so located that the optical axis of the camera objective passes through the center of said surface, the latter being arranged either behind or in front of the diaphragm.

This construction, while giving excellent results when the diaphragm is set at comparatively large apertures, has a minor drawback in that at a smaller, e.g. minimum, aperture of the diaphragm, only a relatively narrow annular passage is left free for the light rays directed towards the film, which may result in undesirable diffraction effects and consequently in lowering the quality of the image produced on the film.

This disadvantage is eliminated by another embodiment of the invention wherein the reflecting surface is arranged in front of the diaphragm and has its center radially spaced from the optical axis of the camera objective, so that at least a major portion of said reflecting surface lies outside of the path of the light rays which pass through the diaphragm, at least when the latter is set at its minimum aperture.

According to a preferred embodiment of the invention the largest dimension of the reflecting surface is smaller than 5 mm. (about 0.19″) so as to correspond to the maximum size of the pupil of a human eye.

In order that the invention may be more readily understood several embodiments thereof as applied to a photographic camera will now be described, by way of example only, with reference to the accompanying drawings in which:

FIG. 6 is a plan view of another embodiment of the view finder of the present invention;

FIG. 7 is a diagrammatic front view of the diaphragm and the reflecting surface of the view finder of FIG. 1;

FIG. 8 is a view similar to FIG. 7, showing a diaphragm and the reflecting surface of the embodiment of FIG. 6; and FIG. 9 is an optical diagram of the view finder associated with the objective of a photographic camera as shown in FIG. 7.

Figure 1:
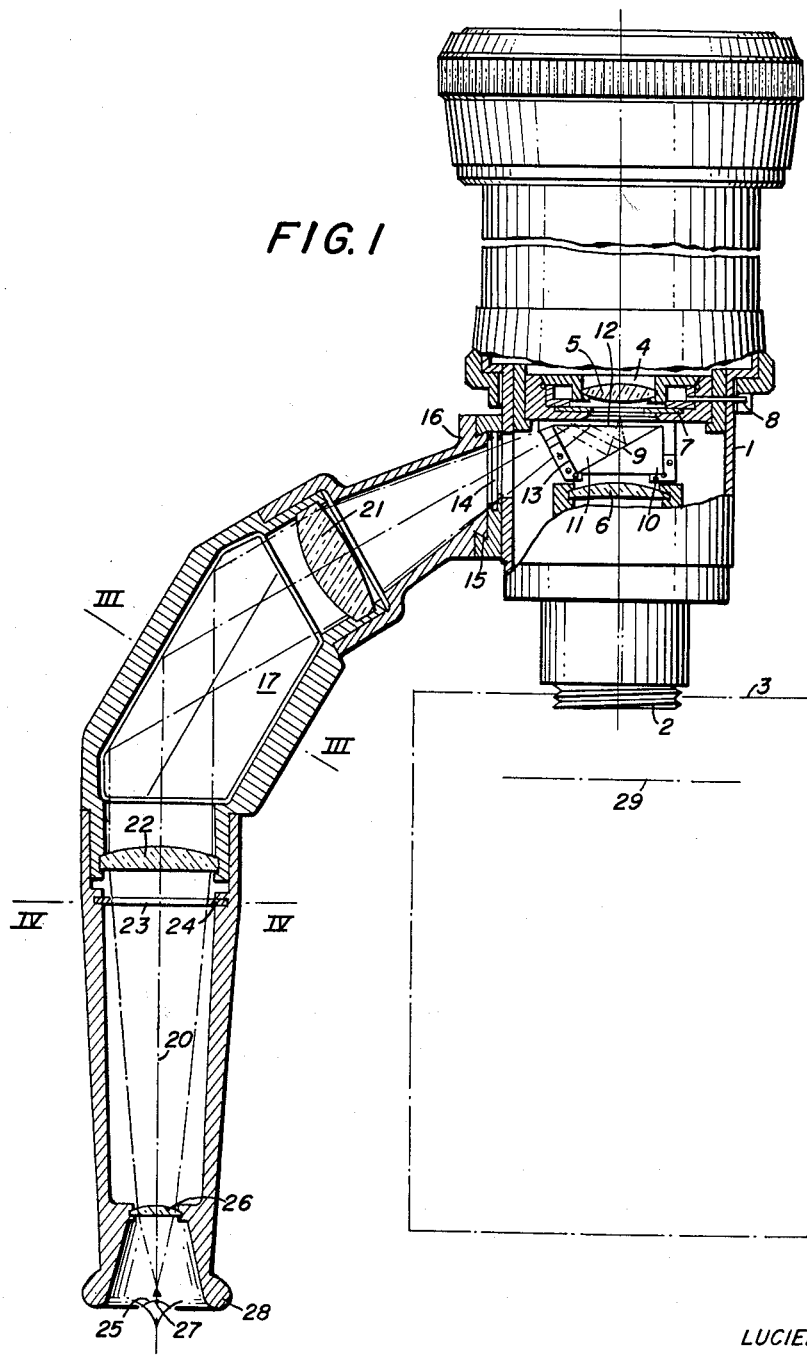
FIG. 1 is a plan view, partly in section, of one embodiment of the view finder of the present invention associated with a photographic camera diagrammatically indicated by chain-dotted lines.

Referring more particularly to FIGURES 1-4, the device illustrated therein comprising a mounting 1 threaded at 2 onto a camera 3.

Mounting 1 encloses lenses 4, 5 and 6 designed to form, alone or in combination with other lenses, an image of a scene, or subject, in the plane of the sensitive surface diagrammatically shown at 29. The mounting 1 also encloses an iris diaphragm 7 controlled from the outside by means of a rod 8.

In order to deflect part of the light from the subject laterally, a small reflecting surface 9 is constituted by a reflecting layer such as a layer of silver or aluminum deposited on one of the faces of a prism 10. Prism 10 is cemented, for example, by means of Canada balsam, onto another prism 11, the angles of said prisms being such that when the latter are cemented to each other, they present two substantially parallel faces substantially perpendicular to the light path between the scene, or the subject, and the photosensitive surface 29.

Figure 2:
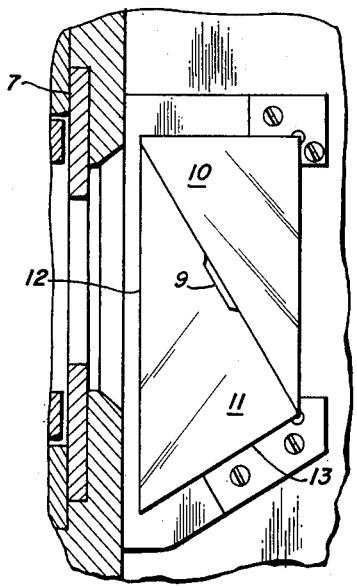
FIG. 2 is an enlarged plan view of a part of the view finder of FIG. 1.
Figure 3:
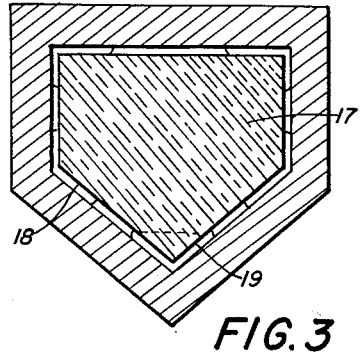
FIG. 3 is a section view on the line III—III of FIG. 1.
Figure 4:
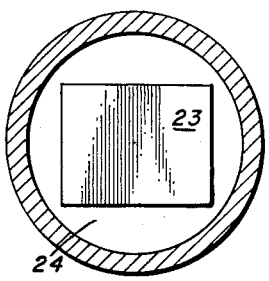
FIG. 4 is a section view on the line IV—IV of FIG. 1.

In FIGS. 1 and 2, the cementing plane which carries the reflecting layer, is inclined at an angle of 60° to the axis of the objective, this axis being coincident with the principal ray of the light beam coming from the center of the scene or subject to be photographed.

After reflection by reflecting surface 9, the beam of light deriving from the subject meets the entrance face 12 of the prism 11. There said beam is totally reflected and leaves prism 11 passing through face 13 thereof, this face being arranged in such a manner that the axis of the light beam reflected by said entrance face 12 is approximately perpendicular to said face 13. Under these conditions said beam is not deflected at its exit from prism 11. The principal ray of the beam leaving prism 11 forms an angle of 60° with the path of the light passing through the camera objective.

The reflected beam of light then passes through a plate or window 14 having substantially parallel faces, which closes the mounting 1 of the camera objective, thus preventing dust and other foreign matter from entering.

Mounting 1 is provided with an external dove-tail groove 15 by which the view finder is attached to mounting 1 by means of a suitable shaped portion of the view finder mounting 16. Mounting 16 may be detached at will from the objective mounting 1. The mounting of the objective on the camera, or its removal therefrom, is considerably facilitated, since objective mounting 1 need not be screwed onto camera 3 or unscrewed therefrom with the view finder structure attached to the objective.

Mounting 16 of the view finder has prism 17 therein having two faces 18 and 19 (FIG. 3) forming an angle of 90° therebetween. Prism 17 bends the principal ray of said reflected beam of light into a direction parallel to the optical axis of the camera as indicated by numeral 20 (FIG. 1). At the same time prism 17 restores the image as observed by the operator, said image thus being viewed by the latter in the same attitude as that of the subject itself when viewed directly by the operator.

A lens 21 is disposed in front of prism 17 and constitutes the objective lens of the view finder and forms a real image of the subject which real image is obtained, through a collector lens 22, in a plane 23 defined by a frame 24.

The function of collector lens 22 is to cause the beam of light passing through the view finder to converge towards the eye 25 of the operator.

A lens 26, constituting the ocular lens of the view finder, produces a magnified image of the image formed in plane 23 at a convenient distance from eye 25. Eye 25 views the magnified image directly.

The real image of the subject is defined by frame 24 in such a manner that the part visible to the eye corresponds to the image formed on the photo-sensitive surface 29.

The image of the reflecting surface 9 is formed through the optical system of the view finder in the zone where the center of the pupil of eye 25 is normally placed, as shown at 27.

The view finder described hereinabove allows a scene to be viewed which corresponds to the image formed on the photo-sensitive surface 29, the image thus viewed being of a high brightness, or luminosity. For convenience of viewing the view finder may include an eye piece 28.

As stated, the eye 25 receives directly the reflected beam of light passing through the described optical system. It will be obvious that, if the image of the reflecting surface 9 formed by the optical system of the view finder is entirely located within the periphery of the pupil of eye 25, all the light rays emitted from said reflecting surface into said optical system will be received by the eye, and no light will be lost. In order that this desirable condition be achieved the reflecting surface 9, which may be of any convenient shape, must have sufficiently small dimensions depending, of course, on the magnification ratio of the view finder. In normal practice the magnification ratio will be chosen to approximate unity. The size of the reflecting surface will then have its largest dimension smaller than 5 mm. (about 0.19″), corresponding to the maximum size of the pupil of the operator's eye.

In view of the small dimensions of the reflecting surface 9 only a small fraction of the light passing through the camera objective is reflected, so that the formation of the image on the photo-sensitive surface 29 is substantially unaffected by said reflecting surface, even though the latter be completely opaque. It should be noted that the scale indicating the various aperture sizes of the iris diaphragm must allow for the portion of the aperture blocked by this reflecting surface.

In spite of its small size the reflecting surface 9 should receive light rays emitted from all points of the subject regardless of the aperture size at which the iris diaphragm 7 is set.

Figure 5:
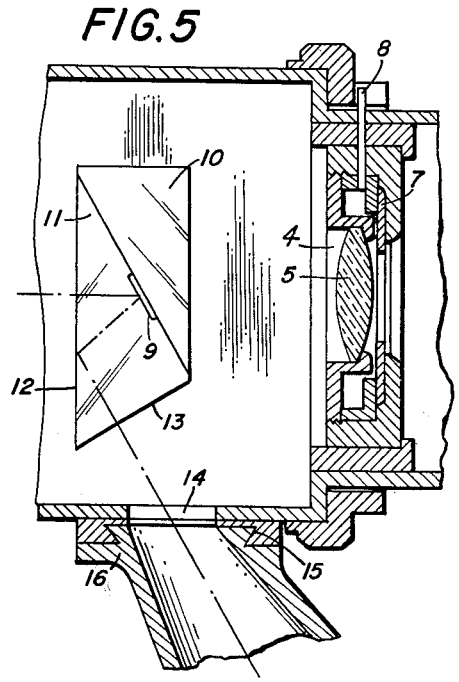
FIG. 5 is a partial sectional view of a modification of the embodiment of FIG. 1.

The variation of the aperture size of the iris diaphragm has substantially no effect on the operation of the view finder when the reflecting surface 9 is arranged in front of the iris diaphgarm (FIG. 5), in which case said surface may be placed rather far from the diaphragm. However, when said reflecting surface is located behind the diaphragm, as shown in FIGS. 1 and 2, it must be arranged near the center of the diaphragm to receive rays issuing from all points of the subject even when passage of these rays is limited by a small diaphragm aperture.

As stated above, the reflecting surface 9, arranged either behind the diaphragm (FIGS. 1 and 2) or in front of the same (FIG. 5), is located in the optical axis of the camera objective and consequently in a centered position with respect to the diaphragm. FIG. 7 shows schematically, in front view, a diaphragm 70 (corresponding to diaphragm 7 in FIGS. 1, 2 and 5) set at its minimum aperture, and a reflecting surface 90 (corresponding to surface 9 of FIGS. 1, 2 or 5) in said centered position with respect to the diaphragm. The reflecting surface having a circular shape shows an elliptical outline as viewed in FIG. 7, due to the inclination of the plane of said reflecting surface with respect to the plane of the drawing. It will be seen that in this particular case, i.e., in the case of minimum aperture of the diaphragm, only a comparatively narrow annular zone is left free for the passage of the light towards the photo-sensitive surface, said zone being defined between the projected periphery of surface 90 and the inner rim of diaphragm 70 limiting the aperture of the latter. It is well known that light passing through such narrow passages is subject to diffraction effects which, in the present case, are obviously undesirable, as they would result in reducing the quality of the image formed on the photo-sensitive surface 29. This disadvantage is overcome and the full benefit of the advantages of the present view finder construction are obtained by the embodiment of the view finder of FIG. 6.

The general arrangement of the view finder of FIG. 6 is similar to that of FIG. 1. Mounting 116 of the view finder is attached to mounting 101 of the objective of camera 103 by means of a dove-tail shaped groove 115. Mounting 116 encloses an objective lens 121; a restoring prism 117; a collecting lens 122; a frame 123; and an ocular lens 126 arranged in an eye piece shade 128, all of which are similar in shape and arrangement to the corresponding elements of FIG. 1.

Mounting 101 of the camera objective includes prisms 110, 111 cemented onto each other, e.g. by means of Canada balsam, while a small reflecting surface 109, constituted by a reflecting layer, of silver, aluminum or the like deposited on one of the faces of a prism, is provided in a manner similar to the one shown in FIG. 1. However, in the present embodiment reflecting surface 109 is disposed in a location radially spaced from the optical axis 130 of the camera objective, and prisms 110, 111 including said surface 109 are located in front of diaphragm 107. Consequently the light issuing from the subject to be photographed arrives at reflecting surface 109 without passing through diaphragm 107. The principal ray of the light beam received by surface 109 is indicated at 131. The light path between reflecting surface 109 and ocular lens 126 via the remainder of the optical system of the view finder is similar to the one described hereinabove with reference to FIG. 1.

Due to the arrangement of reflecting surface 109 spaced from the optical axis 130 and in front of diaphragm 107 no diffraction effect is obtained, whatever the aperture of the diaphragm may be. This is shown in FIG. 8 where diaphragm 107 is set at its minimum aperture, and reflecting surface 109 is seen in front view. It will be seen that the light passing through diaphragm 107 towards the photo-sensitive surface 129 in the camera encounters no obstacle in the zone of the diaphragm aperture when the latter is set at its minimum value, due to the fact that the reflecting surface 109, as viewed in the direction of the optical axis, is located in a zone spaced from said aperture.

Data and dimensions of a preferred embodiment of the view finder of the present invention are discussed below, with reference to FIG. 9, where, according to convention, prism 117 has been replaced by an equivalent glass block having plane parallel entry and exit surfaces perpendicular to the optical axis. The respective lengths of the layers of glass or air which separate the successive dioptric surfaces arranged along the optical axis of the view finder are designated by $e1, e2 \ldots e8$ (FIG. 6). $R1, R2 \ldots R7$ designate the respective radii of curvature of the successive lens faces. These radii are considered positive when the corresponding surface is convex toward the impingent light. These radii are considered negative when the corresponding surface is the convex in the opposite direction. $nD$ designates the index of reflection for each glass through which the light passes corresponding to radiation D, while $v$ designates the Abbe number defined by the correlation:

$$v = \frac{nD-1}{nF-nC}$$

where $nF$ and $nC$ are the indices of reflection of the glass, for radiations F and C, respectively.

[Distance between the reflecting surface 109 and the adjacent face R1 of lens 121=61.5 mm.]

| Lens 121 (objective lens of the view-finder) | | | |
|---|---|---|---|
| $R_1 = +110.2$ mm. | $e_1 = 1.9$ mm. | $nD = 1.6200$ | $v = 36.3$ |
| $R_2 = +25.39$ mm. | $e_2 = 6.6$ mm. | $nD = 1.51872$ | $v = 59.7$ |
| | Effective diameter = 22.3 mm. | | |
| $R_3 = -37$ mm. Distance between lens 121 and Prism 117. | $e_3 = 2.5$ mm. (air) | | |

| Prism 117 (restoring prism of the view-finder) | | | |
|---|---|---|---|
| Length of the path of light rays from entrance face to outlet face. | $e_4 = 62.5$ mm. | $nD = 1.51859$ | $v = 64.4$ |
| Distance between prism 117 and lens 122. | $e_5 = 7.7$ mm. (air) | Effective diameter: 22.3 mm. | |

| Lens 122 (collecting lens of the view-finder) | | | |
|---|---|---|---|
| $R_4 = +51.76$ mm. | $e_6 = 4$ mm. | $nD = 1.51859$ | $v = 64.4$ |
| | Effective diameter 22 mm. | | |
| $R_5 = \infty$ Distance between lens 122 and lens 126. | $e_7 = 66.2$ mm. (air) | | |

| Lens 126 (ocular lens of the view-finder) | | | |
|---|---|---|---|
| $R_6 = +31.84$ mm. | $e_8 = 1.5$ mm. | $nD = 1.51859$ | $v = 64.4$ |
| $R_7 = \infty$ | Effective diameter 9 mm. | | |

The objective 104, 106 of the camera may be the objective disclosed in U.S. Patent No. 2,778,272 to L. Reymond, of January 22, 1957. This objective comprises, in the direction of the light rays, one first group of lenses including a convergent achromatic lens and two divergent lenses respectively arranged at either side of a central convergent lens and interconnected to form a unit movable with respect to said central lens, and a second group of lenses for producing from the virtual image formed by said first group of lenses, a final real image on the photo-sensitive layer of the film provided in the camera. In this case the reflecting surface 109 of the view finder is interposed between the last lens of said first group of lenses and the first lens of said second group of lenses.

Although a specific embodiment of the present invention has been shown and described hereinabove, it should be understood that various modifications thereof are possible. The invention therefore is not to be limited to the precise details of construction shown and described, nor to the preferred data of the optical system indicated hereinabove, but includes all embodiments coming within the scope of the appended claims.

For example, instead of being totally reflected at face 12, or 112 of prism 11 or 111, respectively, the light rays might be reflected directly by surface 9 or 109 so as to be directed towards lens 21 or 121. In this case surface 9 (109) instead of being inclined at an angle of 60° might be inclined at 45° with respect to the optical axis of the camera objective so that light beam 32 (132) would leave the camera objective in a direction perpendicular to the optical axis.

Furthermore, mounting 16 (116) of the view finder might be straight instead of curved in which case prism 17 (117) could be replaced by a lens or system of lenses to restore the attitude of the real image of the subject viewed.

What is claimed is:

1. A view finder for a camera having an objective establishing an image of the subject on a photographic surface at right angles to optical axis of the camera, a substantially opaque fixed reflecting surface substantially the size of the pupil of the eye of a human operator disposed in the path of the light rays from the subject entering the objective, said surface being disposed at an angle to the optical axis so as to reflect a minor portion of the light rays, and an optical system receiving said reflected rays comprising at least one finder objective lens forming a real image of said reflecting surface and a real image of the subject, restoring means for restoring the attitude of the real image of the subject, and an ocular lens for viewing the restored real image of the subject and for forming a final real image of the reflecting surface in a plane normally occupied by the pupil, the magnification ratio of said optical system having a value approximating unity.

2. A view finder for a camera having an objective lens establishing an image on a photographic surface at right angles to the optical axis of the camera and having a diaphragm, a small fixed opaque reflecting surface no larger than the pupil of the eye in the optical axis adjacent the diaphragm and between the diaphragm and the photographic surface covering a small portion of the image forming light beam only and reflecting part of the light from the objective lens and an optical system comprising reflecting prisms, optical lenses, an objective lens and an eye piece receiving the reflected light and constructed and arranged to provide a final real image of said reflecting surface in and no larger than the pupil of the eye located substantially in the region of said eye piece.

3. A view finder for a camera having an objective lens establishing an image on a photo-sensitive surface at right angles to the optical axis of the camera and having a diaphragm, a fixed opaque reflecting surface of limited small size smaller than the pupil of the eye in the optical axis adjacent the diaphragm covering and reflecting a small part of the light from the objective lens and an optical system having a magnifying power of approximately one comprising reflecting prisms, optical lenses, an objective lens including an eye piece for the eye of the user receiving the reflected light from said surface and constructed and arranged to provide a real image of the viewed object between said objective lens of said system and said eye piece and a real image of said reflecting surface in and smaller than the pupil of the eye substantially in the region of said eye piece.

4. A view finder for a camera having an objective lens establishing an image on a photographic surface at right angles to the optical axis of the camera and having a diaphragm, a small fixed opaque reflecting surface smaller than the pupil of the eye of the user in the optical axis adjacent the diaphragm covering and reflecting a small part of the light from the objective lens and an optical system having a magnifying power of approximately one including an objective lens and an eye piece receiving the reflected light from said surface and constructed and arranged to provide a final real image of said reflecting surface substantially at the position of and smaller than the pupil of the eye of the user.

5. A view finder for a camera having an objective lens establishing an image of a subject on a photographic surface at right angles to the optical axis of the camera and having a diaphragm, a substantially opaque reflecting surface having its largest dimension smaller than 5 mm. disposed in the path of the light rays from said subject entering the objective, said surface being disposed in front of the diaphragm and radially spaced from the optical axis of the camera and inclined at an angle with respect thereto to reflect part of the light rays, an optical system receiving the light rays reflected from said surface comprising a finder objective lens forming a real image of said reflecting surface and a real image of the subject, a prism for restoring the attitude of the real image of the subject, and an ocular lens for viewing the restored real image of the subject and forming a final real image of said reflecting surface in the plane normally occupied by said pupil of the user's eye, the magnification ratio of said optical system approximating unity.

References Cited by the Examiner

UNITED STATES PATENTS

| 1,484,584 | 2/24 | Tauern | 95—42 |
| 2,341,410 | 2/44 | Mihaiyi | 95—44 |

FOREIGN PATENTS 669,234   4/52   Great Britain.

OTHER REFERENCES

Book, "The Manufacture of Optical Glass and Optical Systems," Ordnance Dept. Doc. No. 2037, Government Printing Office, 1921, pages 19–22.

NORTON ANSHER, Primary Examiner.

JOHN M. HORAN, Examiner.